United States Patent
Small

[11] Patent Number: 5,174,701
[45] Date of Patent: Dec. 29, 1992

[54] POLE TRAILER SAFETY LATCH

[76] Inventor: Larry D. Small, 971 S. Highway 157, Haughton, La. 71037

[21] Appl. No.: 702,307

[22] Filed: May 20, 1991

[51] Int. Cl.⁵ .............................................. B66C 1/42
[52] U.S. Cl. .................... 410/47; 294/110.1; 414/23
[58] Field of Search ............. 410/34, 42, 47, 49, 410/64; 414/23, 24, 910; 294/19.3, 82.32, 106, 110.1

[56] References Cited

U.S. PATENT DOCUMENTS

| | | | |
|---|---|---|---|
| 1,150,500 | 8/1950 | Chab | 294/82.32 |
| 1,320,688 | 11/1919 | Healy | 294/110.1 |
| 2,245,270 | 6/1941 | Goode | 294/82.32 |
| 2,476,734 | 7/1949 | Jellison | 294/110.1 X |
| 2,708,886 | 5/1955 | Neely | 294/82.32 |
| 2,722,450 | 11/1955 | Nelson | 294/110.1 X |
| 2,789,468 | 4/1957 | Burns | 294/82.32 X |
| 3,106,421 | 10/1963 | Wyrough | 294/110.1 X |
| 3,522,966 | 8/1970 | Wood | 294/110.1 |
| 3,632,145 | 1/1972 | Davis et al. | 410/64 |
| 3,733,101 | 5/1973 | Sayre, Jr. | 294/110.1 X |
| 3,863,973 | 2/1975 | Ross | 294/74 |
| 3,911,981 | 10/1975 | Tucek | 414/23 X |
| 4,026,593 | 5/1977 | Brown et al. | 294/110.1 |
| 4,148,497 | 4/1979 | Gentry | 280/479 A |
| 4,149,623 | 4/1979 | Nelson | 294/110.1 X |
| 4,161,329 | 7/1979 | Pilz et al. | 280/474 |
| 4,269,426 | 5/1981 | Bhushan | 280/432 |
| 4,375,894 | 3/1983 | Hammonds | 410/64 X |
| 4,705,331 | 11/1987 | Britton | 294/110.1 X |
| 4,768,801 | 9/1988 | Dewitt | 280/404 |
| 4,834,437 | 5/1989 | Howard, Sr. | 294/110.1 X |

FOREIGN PATENT DOCUMENTS

| | | | |
|---|---|---|---|
| 1197207 | 7/1965 | Fed. Rep. of Germany | 294/82.32 |
| 1207582 | 12/1965 | Fed. Rep. of Germany | 294/82.32 |
| 60886 | 5/1939 | Norway | 294/110.1 |
| 231768 | 11/1968 | U.S.S.R. | 294/82.32 |
| 319534 | 11/1971 | U.S.S.R. | 294/110.1 |
| 650945 | 3/1979 | U.S.S.R. | 294/110.1 |
| 844546 | 7/1981 | U.S.S.R. | 294/82.32 |
| 850548 | 7/1981 | U.S.S.R. | 294/82.32 |
| 926228 | 5/1982 | U.S.S.R. | 294/110.1 |
| 1245539 | 7/1986 | U.S.S.R. | 294/82.32 |

Primary Examiner—Robert J. Spar
Assistant Examiner—Robert S. Katz
Attorney, Agent, or Firm—Longacre & White

[57] ABSTRACT

This device is for an air operated safety latch designed to hold a folding pole trailer in its stationary or folded position when traveling. The device is comprised of a housing which supports jaw members which can move from an open to a closed position when a pole or other longitudinal member is placed between the jaw members, springs attached to each jaw member, a pivot arm attached to a latch block which locks the jaw members in place when the jaw members are closed, a spring to pull down on the pivot arm and to assist the locking mechanism, and a two-way air cylinder which can serve as a back-up to the locking system and which can be used to unlock and open the jaw members.

12 Claims, 3 Drawing Sheets

POLE TRAILER SAFETY LATCH

BACKGROUND OF THE INVENTION

1. Field of the Invention

This invention is for a safety latch designed to hold a folding pole trailer in its stationary or folded position when traveling on a highway. This invention also has other applications for securely holding other poles or devices that need to be secured while being transported from one location to another.

2. Description of the Prior Art

Pulling, carrying or otherwise transporting a folding pole trailer, or any other vehicle with a longitudinal member, entails certain safety risks. It is not uncommon for the trailer to detach from the cab or truck carrying or pulling the vehicle, thereby creating a road hazard. Detachment can be caused by riding over bumps or potholes in the road or by sudden braking. The detachment of the vehicle or device being transported can result in a serious accident leading to the death and injury of other motorists on the road.

There have been a number of attempts to overcome this problem. U.S. Pat. No. 3,863,329 (Ross) is for an attachment for a pole trailer for facilitating loading of the trailer on the bed of a truck. The attachment includes a length of wire rope bent to a U-shape and maintained so by a bridging piece connecting its free ends. The rope is secured to the pole trailer by means of clamps which engage the rope and maintain the rope in a normal upright position.

U.S. Pat. No. 4,161,329 (Pilz) is for a tractor to trailer connection system in which the tractor is provided with auxiliary trailer attachment or guide means on the rear end of the chassis frame . The trailer guide means is comprised of a cooperating pair of elongated guide plates or guide rail members which are movably mounted on the chassis frame for positioning either in a raised upright operative position or in a lowered inoperative position. The raised guide rails form the ways of a guideway within which the two parallel side beams of the trailer underframe have a snug sliding interfit to firmly lock the tractor chassis frame and trailer underframe together in the horizontal plane thereof as a single rigid unitary frame assembly.

U.S. Pat. No. 4,148,497 (Genty) is for a device for lifting the pole of a trailer of the semi-carried type and coupling the trailer to a tractor vehicle. The device is comprised of a supporting bracket secured beneath and at the rear of the tractor in alignment with the center line thereof, a lever having a hook portion adapted to pick up the shackle of the trailer pole and a crosshead-shaped opposite end, the lever being pivoted to the bracket about a horizontal axis in order to move the hook portion by means of a hydraulic actuator from a low shackle picking-up position to a high coupling and hauling position. The lever is locked by a safety system releasable by manual, electrical or electromagnetic, or hydraulic means.

These devices hinder but do not prevent the unwanted decoupling of the trailer from the attachment device due to road hazards and emergencies. They are also primarily limited to the attachment of a trailer to a cab or tractor type vehicle.

SUMMARY OF THE INVENTION

This device is for an air operated safety latch which can fit on the back of a truck and which is uniquely designed to hold a folding pole trailer in its stationary or folded position when traveling down the highway. The locking mechanism for latching a longitudinal member is comprised of a housing, a pair of oppositely disposed jaw members pivotally disposed on the housing with the jaw members being pivotable between a first unlocked position and a second locked position, with the jaw members substantially surrounding the longitudinal member when the law members are in a locked position. The locking mechanism also has biasing means, usually a set of springs, to hold the jaw members in an open position, and locking means for engaging each of the jaw members when the jaw members are in the locked position. The locking means includes biasing means (usually a spring) for urging the locking means into engagement with the jaw members such that when a longitudinal member, such as a folding pole, is inserted along the midsection into the jaw members when the jaw members are in an open position, the jaw members pivot into the locked position in response to the insertion of the pole, and the jaw members are automatically locked into the locked position by said the locking means.

In a preferred embodiment the jaw members are comprised of two jaws each having an interior portion and an exterior portion, wherein each of the jaws is movably positioned with respect to each other, being movably positioned on the same plane with the interior portion of the jaws opposing each other on the opposite sides of the hollow portion of the housing. The jaws may be pivotally connected to the housing by means of swivel point pins.

In the preferred embodiment the locking mechanism is comprised of a latch block means positioned between each of the jaws, and a pivot arm comprised of an upper arm and a lower arm joined at a bent elbow joint, with the pivot arm being movably connected to the housing structure by means of a pivot arm swivel pin at the elbow joint and the lower arm of the pivot arm being movably connected to the movable latch block. A biasing means, usually a spring, applies a downward force on the upper arm of the pivot arm. The locking mechanism is activated when the longitudinal member is inserted along the midsection of the housing structure and into the interior of the jaw members which, prior to the insertion of the longitudinal member, are in the open position. The springs holding the jaw members in an open position are overridden by the force and weight of the longitudinal member being inserted along the midsection and the jaw members are forced into the closed position. Another spring applies a downward force on the pivot arm and the latch block pivotally connected to the lower arm of the pivot arm is raised into a complementary notched section of the jaws, thereupon locking the jaws in the second closed position.

In yet another embodiment, wear strips are fitted around those parts of the jaw members substantially surrounding the pole of the trailer or any other longitudinal member when that jaws are in the locked position.

The housing can be further comprised of two walls, the inside of each wall facing the inside of the other wall, and two spacers, each spacer attached to the inside of the opposite wall, wherein the jaws of the trailer safety are positioned between the two spacers. A side brace can be added to support the safety latch housing.

The locking member may also be further comprised of a two-way air cylinder with an open first air position and closed second air position. Using the two-way air cylinder, when the jaws are in the second locked position, they can be pivoted to a first unlocked position by application of air pressure via the air cylinder to the open first air position. When the jaw members are in a first unlocked position, they may be pivoted to a second locked position by the application of air pressure to the closed second air position of the two-way cylinder.

In an alternative embodiment, a lever may be substituted instead of an air cylinder, to pivot the jaw members from a first unlocked position to a second locked position and from a second locked position to a first unlocked position.

DETAILED DESCRIPTION OF THE PREFERRED EMBODIMENTS

Figure 1:
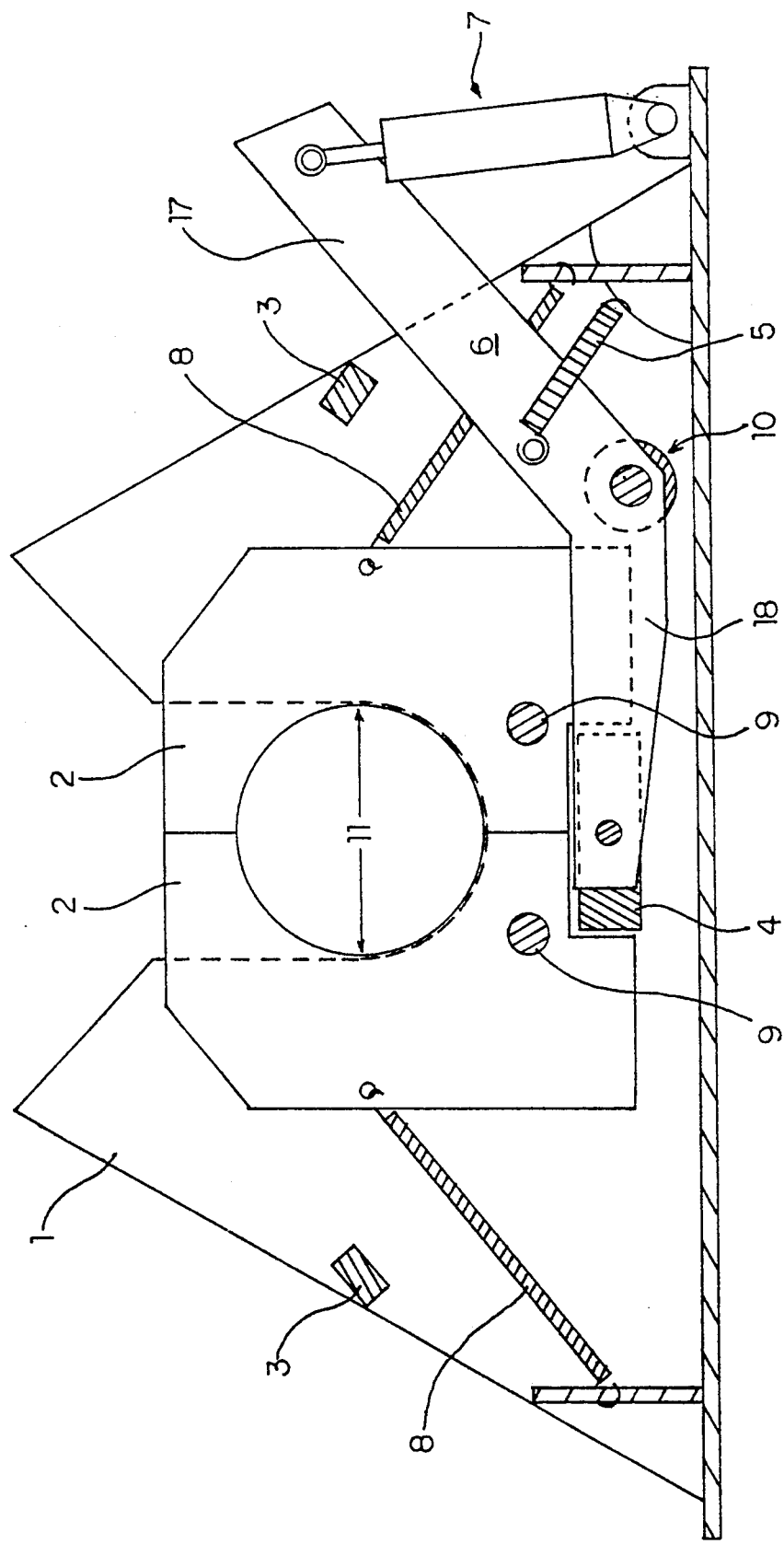
FIG. 1 is a cutaway frontal view of the invention in the closed position.
Figure 2:
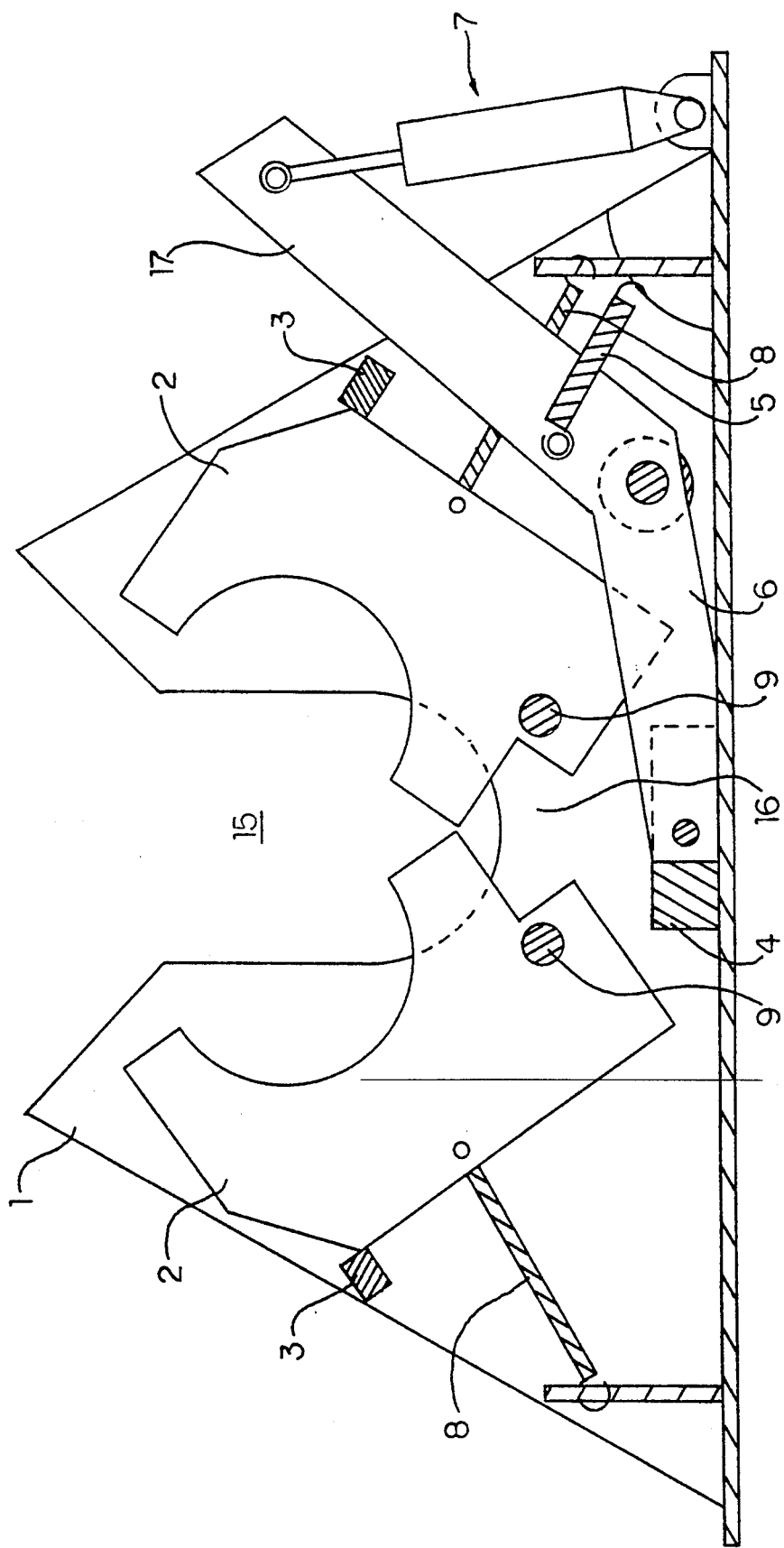
FIG. 2 is a cutaway frontal view of the invention in the open position.

FIGS. 1 and 2 show one embodiment of this invention in the open and closed positions. The jaws 2 are connected to the housing structure 1 by means of swivel point pins 9. The housing structure 1 possesses in this embodiment a centrally located open ended hollow portion 15 which the jaws 2 surround. Each of two springs 8 hold the jaws 2 in an open position against stopping blocks 3, which are attached to the housing structure 1.

A pivot arm 6 is also pivotally attached to the housing structure 1 by means of a pivot arm swivel pin 10 at the elbow of the pivot arm 6. A latch block 4 is pivotally attached to the lower arm 18 of the pivot arm 6. This latch block 4 fits neatly into a notched rectangular cut out section 16 of both jaws 9 when the jaws 9 are in the closed position.

A locking spring 5 is attached at one end to the upper arm 17 of the pivot arm 6 at a point from about midway to the outer end of the upper arm 17 of the pivot arm 6, and to the housing structure 1 at the other end. This locking spring 5, as will be shown shortly, serves the purpose of raising and locking into place the latch block 4 in the notch 16 of the jaws 2.

An air cylinder 7 is attached at one end to the outermost part of the upper arm 17 of the pivot arm 6 and to the base of the housing structure 1 at the other end.

With the air cylinder in the position shown in FIG. 2, (with air pressure flowing to port A), the jaws 2 are in the open position, the pivot arm 6 and the locking block 4 are in the unlatched or open position, and the locking spring 5 has significant tension on it. The two opening springs 8 help hold the jaws 2 in the open position against the stop blocks 3 even after air pressure has been released.

For the latch mechanism to close, a trailer pole or some other longitudinal member is winched down into the jaws. This force forces the jaws 2 closed as shown in FIG. 1. The force of the opening springs 8 are overcome by the downward force of the trailer pole being brought to bear on the jaws 2, thereby allowing the jaws 2 to close. Even without air pressure being pumped to port B, the pivot arm 6 and the locking or latch block 4 will be locked into position by locking spring 5. More specifically, when the top of the jaws 2 move together and close due to the downward force of the trailer pole, the locking spring 5 lowers the upper arm of the pivot arm 6, thereby raising the lower arm of the pivot arm 6. The latch block 4 thereupon moves into the notch at the bottom 16 of jaws created when the jaws 2 are in the closed position. The tension in locking spring 5 prevents the latch block 4 from dropping from the notch in the bottom of the jaws and in turn the latch block 4 prevents the jaws from opening up.

Air pressure, which can be provided from the truck while the truck is running, will be applied to port B, also helping to hold the latch block 4 into the locked position. If air pressure is lost, the locking spring 5 will keep the latch block 4 in the locked position. Jaws 2 are open by applying air to port A on air cylinder 7, therein causing pivot arm 6 to move up and latch block 4 to move down, out of the locked position.

Figure 3:
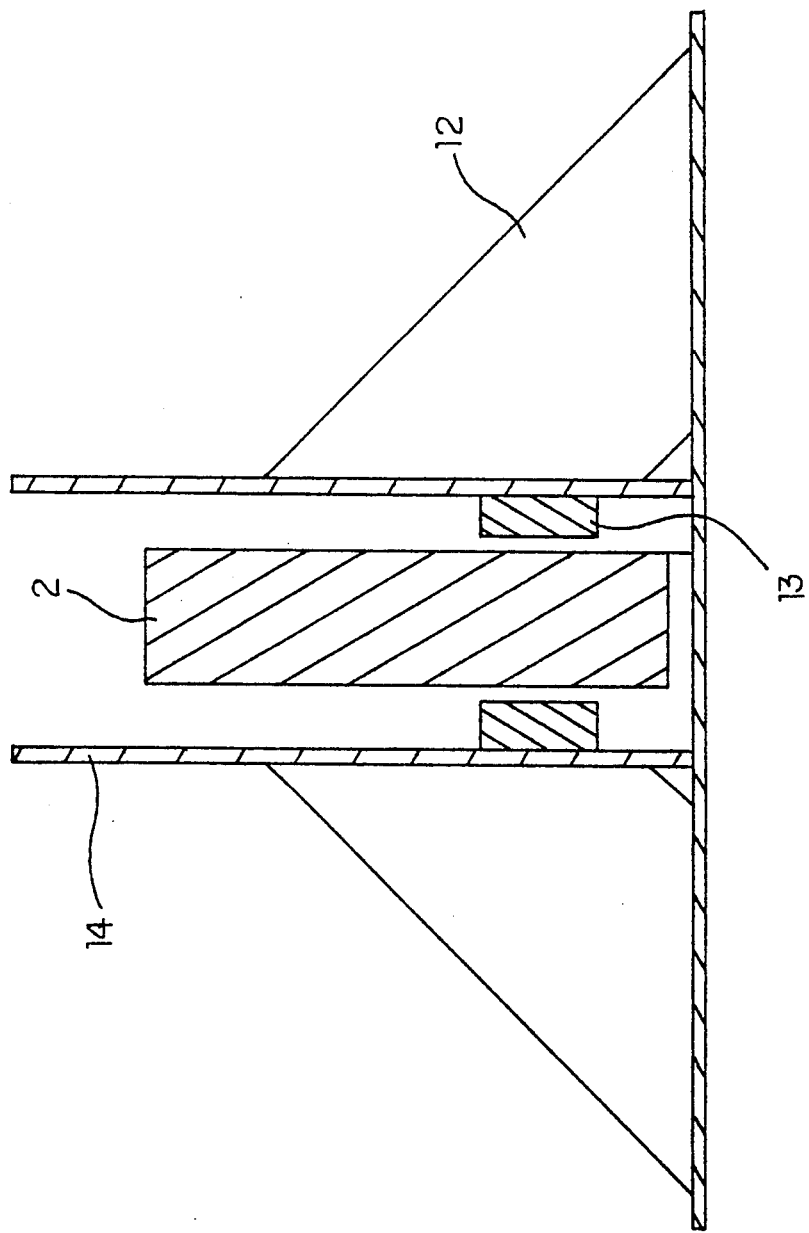
FIG. 3 is a cutaway side view of the invention.

As shown in FIG. 3, the housing system can be supported by side braces 12 positioned perpendicularly on either or both sides of the housing structure 1. Spacers 13 positioned on the walls 14 of the housing structure prevent the jaws 2 from contacting with the walls 14 of the housing structure 1.

In a preferred embodiment of the invention, the inner portion of the jaws upon which the pole trailer or longitudinal member is laid to rest can be lined with wear strips which may be comprised of cloth, plastic, foam rubber, rubber or any other material.

In yet another embodiment of the invention a lever action is attached to the upper arm of the pivot arm 6 instead of an air cylinder, so that the jaws 2 can be opened manually. Similarly an electric or combustion engine, electromagnetic means or a hydraulic system, can also serve to open and help close the jaws 2.

What is claimed is:

1. A locking mechanism for latching an elongated member therein, said locking mechanism comprising:
    a housing having a opening adapted for the entry of the elongated member therein;
    a pair of oppositely disposed jaw members pivotally mounted to said housing, said jaw members being pivotable between a first unlocked position and a second locked position, said jaw members substantially surround said elongated member when said jaw members are in said second locked position; each of said jaw members having an interior portion and an exterior portion, wherein each of said jaw members is movably positioned with respect to each other and being movable in the same plane, the interior portion of each of said jaw members opposing each other on the opposite sides of said opening of said housing, said exterior portion of each of said jaw members being shaped such that a joined notched section is formed when the jaw members are in said second locked position;
    jaw member biasing means for urging said jaw members into said first unlocked position; and
    locking means for holding said jaw members in said second locked position, said locking means including a pivot arm having an upper arm portion and a lower arm portion joined at a bent elbow joint, said pivot arm being pivotable about a pivot arm swivel pin mounted on said housing and to said elbow joint, a latch block attached to the lower arm portion of said pivot arm, and pivot arm biasing means attached to said upper arm portion of said pivot arm for urging said latch block to engage said joined notch section of said jaw members in said second locked position;

wherein said jaw members pivot from said first unlocked position to said second locked position in response to the insertion of said elongated member into said opening, contacting said interior portion of said jaw members, and generating a force to override the force of the jaw member biasing means, and said jaw members being automatically locked in said second locked position by said the insertion of the latch block into the joined notch section of the jaw members by the pivot arm biasing means.

2. The locking mechanism according to claim 1, wherein said latch block is pivotally connected to the lower arm portion of the latch arm.

3. The locking mechanism according to claim 1, wherein the jaw member biasing means comprise two springs, each spring attached to a different jaw member.

4. The locking mechanism according to claim 1, wherein said opening is centrally located on said housing.

5. The locking mechanism according to claim 1, wherein said pivot arm biasing means is a spring.

6. The locking mechanism according to claim 1, further comprising wear strips fitted around those parts of said jaw members which substantially surround said elongated member when in said second locked position.

7. The locking mechanism according to claim 1, wherein the housing includes two walls facing each other and two spacers, each spacer attached to the inside of the opposite wall, wherein the jaw members are positioned between the two spacers.

8. The locking mechanism according to claim 1, further comprising at least one side brace adapted to support the housing when mounted to a support surface of a vehicle.

9. The locking mechanism according to claim 1, wherein said locking means includes a powered means for pivoting said pivot arm.

10. The locking mechanism according to claim 1, wherein said powered means is a two-way air cylinder.

11. The locking mechanism according to claim 1, further comprising at least one stop block positioned on said housing, wherein said at least one stop block prevents outward movement of one said jaw member when said jaw members are in said first unlocked position.

12. The locking mechanism according to claim 11, further comprising two stop blocks.

* * * * *